United States Patent [19]

Gutshall

[11] Patent Number: 4,572,875

[45] Date of Patent: Feb. 25, 1986

[54] BLANK FOR A THREAD FORMING SCREW

[76] Inventor: Charles E. Gutshall, 2911 E. State St., Rockford, Ill. 61108

[21] Appl. No.: 569,823

[22] Filed: Jan. 11, 1984

[51] Int. Cl.$^4$ .............................................. B21H 3/04
[52] U.S. Cl. .................................... 428/585; 428/577
[58] Field of Search ............ 428/577, 583, 585, 542.8; 411/386, 387

[56] References Cited

U.S. PATENT DOCUMENTS

| 2,278,411 | 4/1942 | Braendel | 411/386 |
| 2,871,751 | 2/1959 | Lemke | 411/387 |
| 3,083,609 | 4/1963 | Lovisek | 411/386 |
| 3,207,024 | 9/1965 | Sommer | 411/387 |
| 3,370,501 | 2/1968 | Ansingh | 411/387 |
| 4,042,342 | 8/1977 | Muenchinger | 428/585 |
| 4,069,730 | 1/1978 | Gutshall | 411/386 |
| 4,104,446 | 8/1978 | Johnson | 428/585 |
| 4,259,889 | 4/1981 | Capvano | 411/386 |
| 4,486,135 | 12/1984 | Kazino | 411/387 |

*Primary Examiner*—L. Dewayne Rutledge
*Assistant Examiner*—John J. Zimmerman
*Attorney, Agent, or Firm*—Charles F. Meroni, Jr.

[57] ABSTRACT

A method for manufacturing thread-forming screws wherein the tapered leading end of the screws can include thread portions or sections having sharp crests but wherein the thread-forming screws can be made using conventional flat thread rolling dies. Also provided is a screw blank having a tapered leading end particularly shaped or formed such that when the threads are rolled on the screw blank using conventional flat thread rolling dies, the tapered leading end of the screw will include thread sections having sharp crests.

7 Claims, 5 Drawing Figures

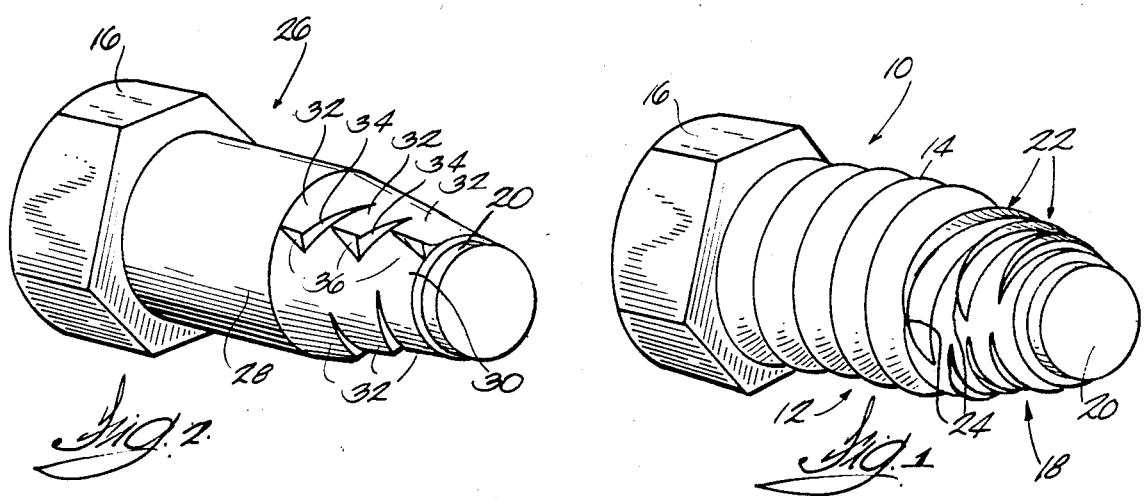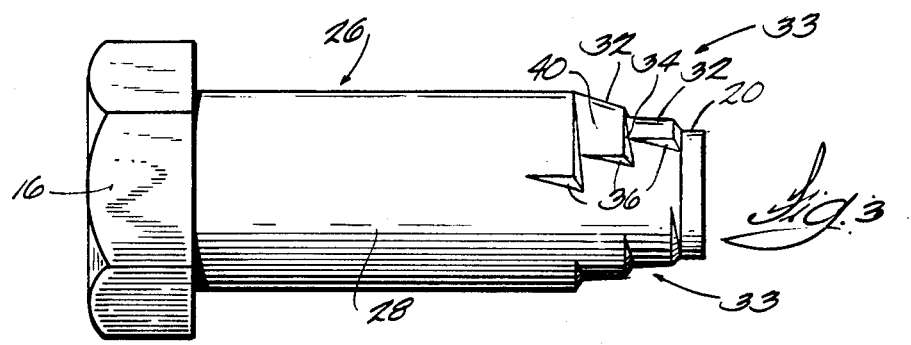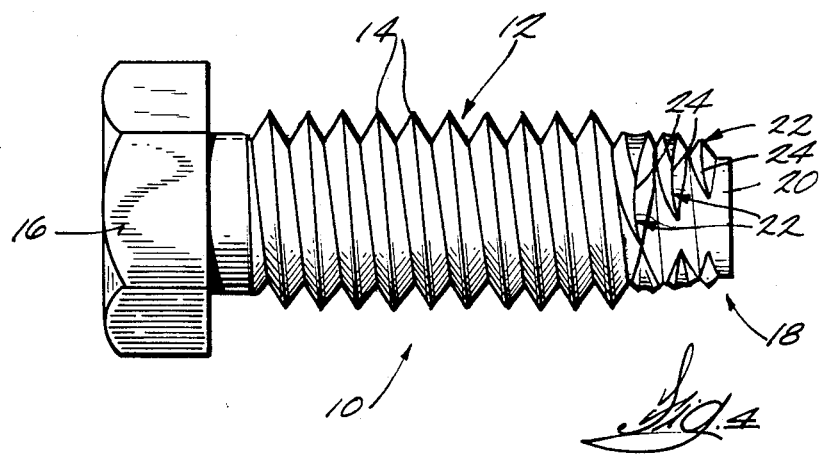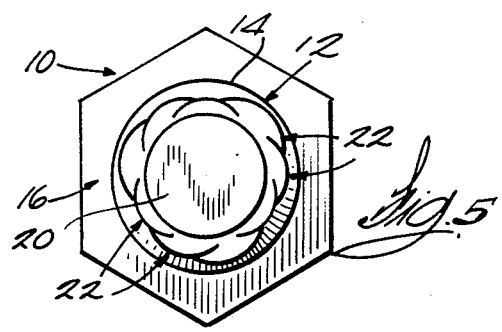

4,572,875

BLANK FOR A THREAD FORMING SCREW

FIELD OF THE INVENTION

The invention relates to self-tapping screws and thread-forming screws of the type for swaging threads in a bore in a workpiece and further relates to a screw blank and to a method used in manufacturing thread-forming screws.

BACKGROUND PRIOR ART

Self-tapping screws are commonly of two types, one type including a portion of the screw which cuts away material from the workpiece to produce a thread, and the other type forms a thread in a bore of a workpiece by causing the metal or other material of the workpiece to be deformed or flow as the thread-forming screw is forced into the bore. The latter type of self-tapping screw or thread-forming screws are commonly preferred over the thread-cutting screws because a thread-forming screw work-hardens the workpiece as the thread-forming screw is forced into the bore.

Such thread-forming screws commonly include a tapered leading end which is at least partially threaded. There are two common methods for use in forming a thread-forming screw. In one such method threads are rolled on a screw blank including a tapered end portion, using conventional flat thread rolling dies. When flat thread rolling dies are employed, the threads on the tapered end portion of the screw are not fully formed and do not have sharp crests. Since these leading threads are not sharp, they will not readily deform the metal of the workpiece, and when the thread-forming screws are forced into the workpiece, a substantial torque must be applied on the screw to cause it to form the desired thread.

In an alternative method for making a thread-forming screw, the dies used to roll the threads include tapered portions conforming to the taper of the screw blank and particularly constructed to form the threads on the tapered leading end of the thread-forming screw. Screws formed in this manner are preferred because the threads on the tapered portion of the screw blank will be provided with sharp crested threads. Accordingly, these thread-forming screws can be more efficiently forced into the bore in a workpiece and substantially less torque is required. On the other hand, screws formed in this manner and through the use of dies that include tapered portions are substantially more expensive, in part, because the dies used for rolling the threads are substantially more expensive than conventional flat thread rolling dies.

SUMMARY OF THE INVENTION

The present invention provides a method for manufacturing thread-forming screws wherein the tapered leading end of these screws can include thread portions or sections having sharp crests but wherein the thread-forming screws can be made using conventional flat thread rolling dies.

The present invention includes the provision of an improved screw blank having a tapered leading end particularly shaped or formed such that when the threads are rolled on the screw blank using conventional flat thread rolling dies, the tapered leading end of the screw will include thread sections having sharp crests.

Referring more particularly to the construction of the screw blank, it includes an elongated substantially cylindrical shank portion having one end adapted to be cooperable with a tool for turning the thread forming screw, and the other end is adapted to be threaded to form a work entering tapered thread forming pilot portion. This end of the cylindrical shank portion includes a plurality of steps spaced apart in the direction of the longitudinal axis of the screw blank step including a shoulder generally defining a plane transverse to the longitudinal axis and facing the end of the shank. Each of the steps also includes an end wall defining a surface transverse to the plane of the shoulder and intersecting the shoulder to define a corner.

In a preferred embodiment of the invention the cylindrical shank portion includes a plurality of sets of steps spaced circumferentially around the cylindrical shank portion and each set includes a plurality of steps spaced apart in the direction of the longitudinal axis of the blank.

Various other features and advantages will be apparent by reference to the following description of the preferred embodiment, from the drawings, and from the claims.

BRIEF DESCRIPTION OF THE DRAWINGS

FIG. 1 is a perspective view of a thread-forming screw embodying the invention.

FIG. 2 is a perspective view of a screw blank embodying the invention and used to form the thread-forming screw illustrated in FIG. 1.

FIG. 3 is a side elevation view of the screw blank illustrated in FIG. 2.

FIG. 4 is a side elevation view of the screw shown in FIG. 1.

FIG. 5 is an end view of the screw illustrated in FIG. 4.

Before describing a preferred embodiment of the invention in detail, it is to be understood that the invention is not limited in its application to the details of construction and to the particular arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

FIG. 1 illustrates a thread-forming screw 10 embodying the invention and comprising an elongated shank having a main body portion 12 on which there is formed a continuous helical thread 14. One end of the body portion is attached to a conventional head 16 or other means cooperable with a tool for driving the screw, and at its other end the body portion 12 terminates in a pilot or thread-forming portion 18 of the screw. The thread-forming portion 18 is tapered from the body portion 12 toward the end 20 of the screw. Despite the taper of the end 18 of the screw, the screw includes a plurality of thread sections 22 each having sharp crests 24, the threaded sections 22 being spaced circumferentially around the tapered end 18 of the screw. One of the advantages of the screw illustrated in FIG. 1 and manufactured in accordance with the method of the invention is that the thread sections 22 on the tapered end portion 18 of the screw include sharp crests 24 even though the screw threads 22 on the tapered end are formed in a conventional flat die.

Illustrated in FIG. 2 is a screw blank 26 for use in forming the screw shown in FIG. 1. The screw blank 26 for use in forming the screw 10 is formed from a conventional elongated cylindrical initial blank placed in a heading die of a conventional heading machine and shaped in the heading die. The screw blank 26 includes a conventional head 16 and an elongated cylindrical shank portion 28 extending from the screw head 16. The opposite end of the shank portion 28 terminates in a tapered end portion 30 including a plurality of steps 32. While the steps 32 may be arranged in other patterns as will be appreciated by reference to the following description, in the illustrated arrangement, the end 30 of the screw blank 26 including the steps 32 includes three sets 33 of steps 32, the sets being spaced circumferentially around the end of the screw blank 26. While other embodiments could include more or fewer steps, in the illustrated construction, three sets of steps are provided and each set is comprised of three steps 32, the three sets of steps being spaced apart in the direction of the longitudinal axis of the screw blank.

Each step 32 is comprised of a shoulder 34 generally defining a plane or surface transverse to the longitudinal axis of the screw blank 26. While in the illustrated configuration the shoulder 34 defines a plane which is at an angle of approximately 90° with respect to the longitudinal axis of the screw blank, the shoulder 34 could be sloped toward the screw head 16, though in a preferred form of the invention the surface of the shoulder will be sloped in at least 45° angle, i.e., an angle of at least 45° with respect to the longitudinal axis of the screw blank 26.

Each step 32 also includes an end wall 36 defining a plane or a surface extending generally parallel to the longitudinal axis of the screw blank 26, this plane also extending through the body portion of the blank and being transverse to the surface defined by the shoulder 34. While in other embodiments, the end wall 36 could be positioned at an acute angle with respect to the longitudinal axis of the blank 26, in the illustrated arrangement the end wall 36 defines a plane including the longitudinal axis and extending radially from the longitudinal axis. In other embodiments the end wall 36 could also be sloped such that the plane of the end wall 36 defines an acute angle with respect to a plane including the longitudinal axis and extending radially from the longitudinal axis.

In the illustrated construction the end wall 36 intersects the shoulder 34 so as to define a relatively sharp corner.

Each step also includes a step surface 40 extending in the direction of the longitudinal axis from a shoulder of a first step of a set of steps to a shoulder of an adjacent step of that set of steps. The step surface 40 also extends circumferentially from the end wall 36 of a step of one set of steps to an end wall 36 of a corresponding step of an adjacent set of steps. While the step surface 40 could have other configurations, in the illustrated arrangement, the step surface 40 is curved circumferentially around the longitudinal axis of the screw blank 26 such that the step surface 40 has a radius of curvature substantially the same as that of the body portion 28 of the screw blank.

While the end portion 30 of the screw blank and the steps 32 could be formed during an operation following the formation of the screw head 16 in a heading die, in a preferred form of the invention the steps 32 of the screw blank 26 are formed simultaneously with the formation of the head 16 in the heading die.

Once the screw blank 26 is formed so as to include a tapered end 30 including the configuration described above, threads 14 and 18 are rolled on the screw blank using conventional flat thread rolling dies. The screw blank 26 is placed between the thread rolling dies in a conventional manner and the thread is formed in the screw blank as the screw blank is compressed between the thread rolling dies and rolled.

As the screw blank 26 is rolled between the thread-forming dies, the metal of the screw blank is extruded in a conventional manner. When a non-tapered screw blank is rolled in a flat die, the thread rolling causes material at the end of the screw blank to be extruded in such a manner as to form a thread crest at the end of the blank and extending outwardly from the end of the screw blank, i.e., the crest extends from the end of the blank in the direction of the longitudinal axis of the screw blank and away from the screw head.

The tendency of the material at the end of a non-tapered screw blank to be extruded so as to form a sharp ridge on the end of a conventional rolled screw, is effective to produce a thread portion having a sharp crest at each of the steps. As the screw blank is rolled, the material of each step immediately proximate the shoulder, tends to be extruded in the same manner as the material at the end of the screw blank so as to form a relatively sharp crest. As the screw blank is rolled further between the thread rolling dies this extruded material is aligned with the screw thread being formed so as to form a sharp crest. In other words, this thread portion which tends to be extruded in the longitudinal direction is "peeled" so as to extend radially and to form a sharp thread. The finished thread-forming screw will then have a sharp crest formed in the area of each of the steps of the screw blank. These sharp crests will be spaced circumferentially around the end of the thread-forming screw in the same manner that these steps are spaced around the screw blank.

In a preferred form of the invention the shoulders are spaced apart by a distance approximating that between the crests of the screw thread being formed.

Various features of the invention are set forth in the following claims.

I claim:

1. An elongated blank for use in manufacture of a thread forming screw having helical screw threads, said threads including crests, said elongated blank comprising an elongated substantially cylindrical shank portion having a longitudinal axis and opposite ends, means at one of said opposite ends adapted to be cooperable with a tool for turning the thread forming screw, the other of said opposite ends of said cylindrical shank portion being adapted to be threaded to form a work entering tapered thread forming pilot portion, said other end of said cylindrical shank portion including a plurality of steps spaced apart in the direction of said longitudinal axis, each of said steps including a shoulder generally defining a plane transverse to said longitudinal axis and said shoulder facing said other end of said cylindrical shank, and each of said steps including an end wall defining a surface transverse to said plane of said shoulder.

2. An elongated blank as set forth in claim 1 wherein said other end of said cylindrical shank portion includes a plurality of sets of steps, said sets being spaced circumferentially around said other end of said cylindrical shank portion and each of said sets including a plurality of steps spaced apart in the direction of said longitudinal axis.

3. An elongated blank as set forth in claim 1 wherein said shoulders each include a radially inner portion and a radially outer portion and wherein said steps each include a step surface extending from a radially outer portion of said shoulder in substantially the direction of said longitudinal axis and intersecting a radially inner portion of a shoulder of an adjacent step.

4. An elongated blank as set forth in claim 1 wherein said step surface, said shoulder and said end wall of each of said steps intersect to form a corner.

5. An elongated blank as set forth in claim 1 whwerein said shoulders are spaced apart in the direction of said longitudinal axis by a distance substantially the same as the distance between said crests of said screw threads.

6. An elongated blank as set forth in claim 3 wherein said step surfaces are curved about said longitudinal axis and wherein each of said step surfaces has a radius of curvature substantially equal the radius of curvature of the surface of said cylindrical shank portion.

7. An elongated blank as set forth in claim 1 wherein said other end of said cylindrical shank includes a plurality of sets of steps, said steps being spaced apart cicumferentially around said other end of said cylindrical shank, each of said sets of steps including at least one step and wherein said end wall of each of said steps include an upper edge and a lower edge and wherein one of said steps includes a step surfaces extending circumferentially from an upper edge of an end wall of a first step of one of said sets of steps to a lower edge of an end wall of a step of an adjacent set of steps.

* * * * *